United States Patent [19]

Simizu

[11] 4,024,348
[45] May 17, 1977

[54] REMOTE CONTROLLABLE AUTOMATIC TELEPHONE ANSWERING APPARATUS

[75] Inventor: Terumasa Simizu, Kawagoe, Japan

[73] Assignee: Pioneer Electronic Corporation, Tokyo, Japan

[22] Filed: June 25, 1975

[21] Appl. No.: 590,521

[30] Foreign Application Priority Data

June 25, 1974 Japan .............................. 49-71830

[52] U.S. Cl. ................................................ 179/6 E
[51] Int. Cl.$^2$ ......................................... H04M 1/64
[58] Field of Search .......... 179/6 E, 2 A, 100.1 DR

[56] References Cited

UNITED STATES PATENTS

| | | | |
|---|---|---|---|
| 3,133,992 | 5/1964 | Dickman | 179/6 E |
| 3,903,369 | 9/1975 | Darwood | 179/6 E |
| 3,917,905 | 11/1975 | Buglewicz | 179/6 E |

Primary Examiner—Raymond F. Cardillo, Jr.
Attorney, Agent, or Firm—Sughrue, Rothwell, Mion, Zinn & Macpeak

[57] ABSTRACT

An automatic telephone answering apparatus of the type including a tape transport mechanism having an endless loop answering message tape and a recording tape with a record/playback head for recording and playing back previously recorded messages is disclosed. The apparatus comprises a remote control circuit responsive to single frequency remote control signals for distinguishing between a plurality of instructive signals. The remote control circuit accomplishes this by changing time constant circuits in response to time sequential remote control signals.

3 Claims, 3 Drawing Figures

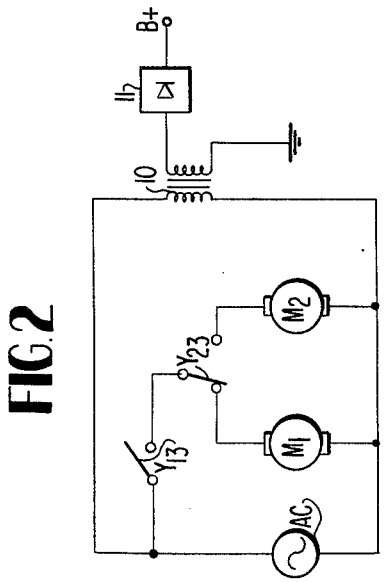
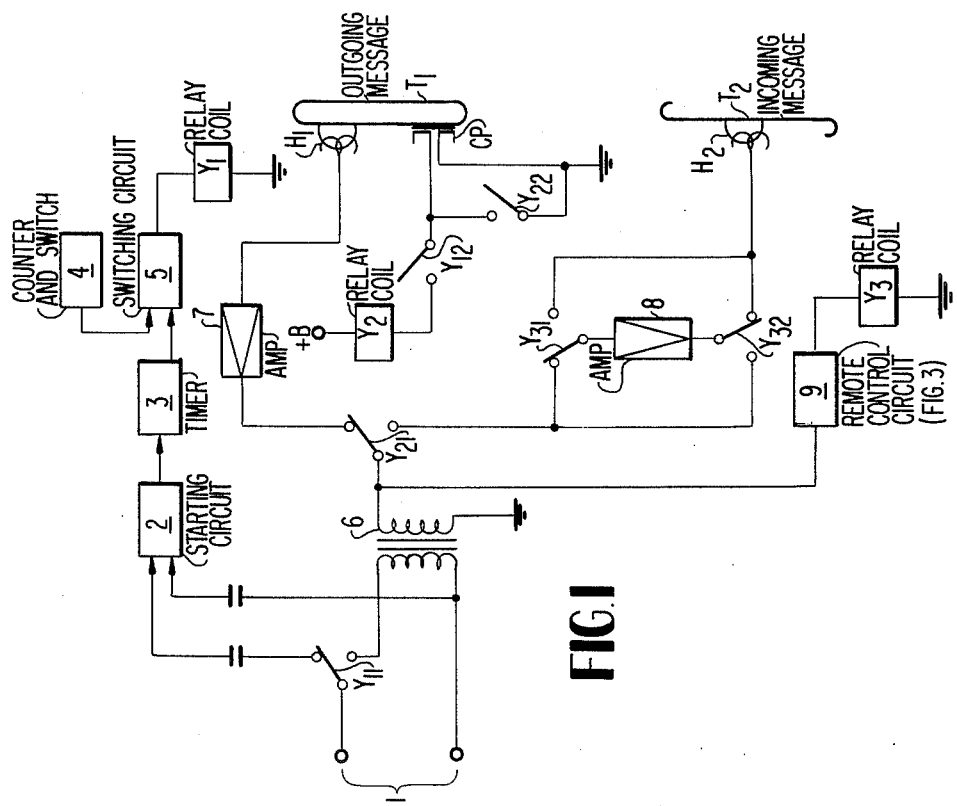

REMOTE CONTROLLABLE AUTOMATIC TELEPHONE ANSWERING APPARATUS

BACKGROUND OF THE INVENTION

1. Field of the Invention

This invention relates to an improvement of a remote controllable automatic telephone answering apparatus such that a particular caller, generally the apparatus owner, can reproduce and listen to messages recorded in his absence by remote control.

2. Description of the Prior Art

Although such a remote controllable automatic telephone answering apparatus has been known, it is difficult to remotely control the aparatus to partially rewind a tape in order to listen again to messages recorded on the tape. For example, in some prior art apparatuses, the rewinding instructive signals (hereinafter referred to as first remote control signals) were required to be a different frequency from instructive signals (hereinafter referred to as sound remote control signals) for partially rewinding the tape for the remote reproduction. Therefore, two band-pass filters are required at the apparatus, and it is necessary to provide an oscillator having two frequencies for the caller who carries out the remote control.

SUMMARY OF THE INVENTION

According to the present invention, the described disadvantage is eliminated. Therefore, it is an object to provide a remote controllable automatic telephone answering apparatus wherein remote control signals each having the same frequency are used for a plurality of instructive signals without utilizing different frequencies for the first and second remote control signals.

BRIEF DESCRIPTION OF THE DRAWINGS

The specific nature of the invention, as well as other objects, aspects, uses and advantages thereof, will clearly appear from the following description and the accompanying drawings, in which:

FIG. 1 is a block diagram of a telephone answering apparatus including the remote control circuit according to the invention;

FIG. 2 is a schematic diagram of the motor drive circuit for the telephone answering apparatus shown in FIG. 1.

DESCRIPTION OF THE PREFERRED EMBODIMENT

Figure 3:
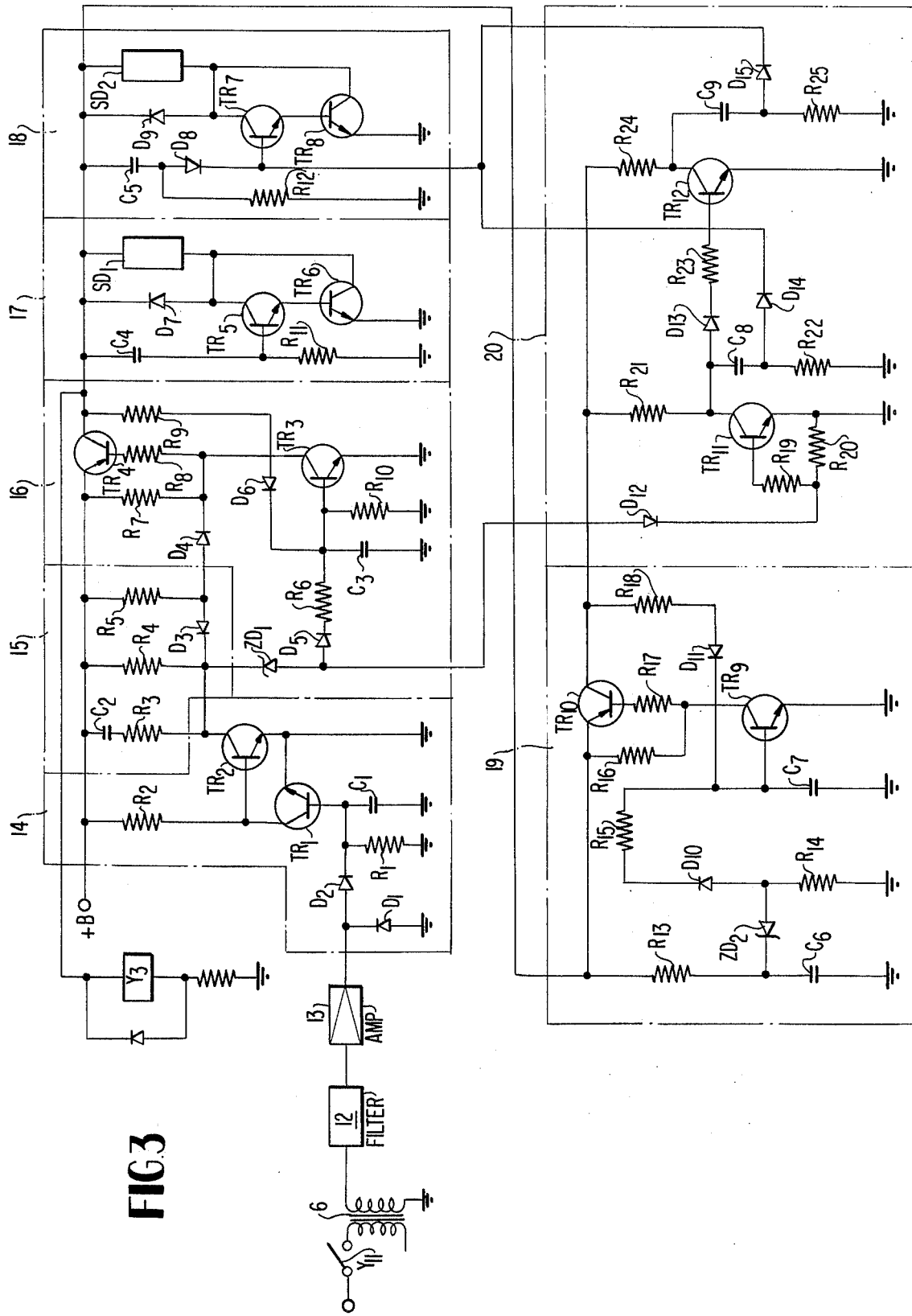
FIG. 3 is a schematic diagram of the remote control circuit for the telephone answering apparatus according to the invention.

Telephone answering apparatus of the type to which the present invention is directed is described, for example, in U.S. Pat. No. 3,894,188 and reference may be had to that patent for details of structure and operation only briefly described herein.

Referring now to FIG. 1, the telephone answering apparatus includes a connection terminal 1 for the telephone circuit, a starting circuit 2 for rectifying and storing call signals coming to the connection terminal 1 and for driving a following timer circuit 3 after 3–10 seconds. The timer circuit 3 is actuated by an output of the starting circuit 2 and determines the operating time of the automatic telephone answering apparatus. The counter and switch 4 is of the type wherein contacts are closed as soon as the counter is set to 0 and a message recording tape $T_2$ is rewound to a counter indication of 999, and wherein the contacts are opened as soon as the message recording tape $T_2$ is reproduced and the counter advances from 999 to 0. Such a counter and switch is disclosed, for example, in U.S. Pat. No. 3,627,228. A switching circuit 5 remains in the ON state so long as an input from the timer circuit 3 is present or so long as the counter switch 4 is closed. $Y_1$ is a relay having three contacts $Y_{11}$, $Y_{12}$ and $Y_{13}$ actuated by the output of the switching circuit 5. A matching transformer 6 is connected to the connection terminal 1 through the contact $Y_{11}$ of the relay $Y_1$, and an amplifier 7 is connected to a secondary winding of the matching transformer 6 through a contact $Y_{21}$ of a relay $Y_2$ later described. Amplifier 7 amplifies a reproduced output signal of a magnetic head $H_1$ associated with an answering tape $T_1$ for previously recording an answering message. Tape $T_1$ is an endless tape in this embodiment. CP is a contact piece for detecting a conductive foil(s) adhered to the answering tape $T_1$. A message recording tape $T_2$ is used to record message signals from the caller and has associated therewith a magnetic head $H_2$. $Y_2$ is a relay having three contacts $Y_{21}$, $Y_{22}$ and $Y_{23}$ which are actuated when the contact piece CP is electrically shorted by means of the conductive foil(s) of the answering tape $T_1$. An amplifier 8 is used to amplify the voice of a caller from the telephone circuit or signals from the magnetic head $H_2$ for the message recording tape $T_2$. A remote control circuit 9 shown in FIG. 3 in detail is actuated by remote control signals to control a relay $Y_3$ having two contacts $Y_{31}$ and $Y_{32}$.

In FIG. 2, a commercial alternating power source is used to drive the tape mechanism motors. $M_1$ is a driving motor for the answering tape $T_1$, and $M_2$ is a driving motor for the message recording tape $T_2$. A transformer 10 and a rectifying circuit 11 comprise power supply to the circuits described in FIG. 1.

Referring now to FIG. 3, the remote control circuit 9 includes a filter circuit 12 for passing only remote control signals therethrough, an amplifier 13, and a first switching circuit 14 for rectifying the remote control signals amplified by the amplifier 13. The switching circuit 14 comprises transistors $Tr_1$ and $Tr_2$, diodes $D_1$ and $D_2$, resistors $R_1$ and $R_2$ and a condenser $C_1$. 15 is a time constant circuit which comprises a first time constant circuit constituted by a condenser $C_2$ and resistors $R_3$, $R_4$ and $R_5$, a second time constant circuit constituted by the condenser $C_2$ and resistors $R_3$ and $R_4$, and a switching diode $D_3$ for changing first and second time constant circuits. 16 is a switching circuit for a first power source and comprises transistors $Tr_3$ and $Tr_4$, a Zener diode $ZD_1$, diodes $D_4$, $D_5$ and $D_6$, a condenser $C_3$, and resistors $R_6$ to $R_{10}$. The transistors $Tr_3$ and $Tr_4$ turn ON when the Zener diode $ZD_1$ conduits to supply electric power to the circuits which follow switching circuit 16. 17 is a driving circuit for counter reset and comprises a solenoid $SD_1$, transistors $Tr_5$ and $Tr_6$ for driving the selenoid $SD_1$, a diode $D_7$, a condenser $C_4$ and a resistor $R_{11}$. The solenoid $SD_1$ is energized by the transistors $Tr_5$ and $Tr_6$ when they turn ON after a period of time (1 second, for example) determined by the condenser $C_4$ and the resistor $R_{11}$ to reset the counter and switch 4 to zero. 18 is a tape control driving circuit and comprises transistors $Tr_7$ and $Tr_8$, diodes $D_8$ $D_9$, a solenoid $SD_2$, a condenser $C_5$ and a resistor $R_{12}$. The transistors $Tr_7$ and $Tr_8$ turn ON at a period of time (1 second, for example) determined by the condenser $C_5$ and the resistor $R_{12}$ and drive the solenoid $SD_2$ to either rewind the message recording tape $T_2$ or put the tape $T_2$ in the reproducing state. 19 is a switching circuit for a second power source and comprises transistors $Tr_9$ and $Tr_{10}$, a Zener diode $ZD_2$, diodes $D_{10}$ and $D_{11}$, condensers $C_6$ and $C_7$, and resistors $R_{13}$ to $R_{18}$. The Zener diode $ZD_2$ conducts after a time period (10 seconds, for example) determined by the condenser $C_6$ and the resistor $R_{13}$, and then the transistors $Tr_9$ and $Tr_{10}$ turn ON to supply electric power to the circuits which follow switching circuit 19. 20 is a switching circuit which comprises transistors $Tr_{11}$ and $Tr_{12}$, diodes $D_{12}$ to $D_{15}$, condensers $C_8$ and $C_9$ and resistors $R_{19}$ to $R_{25}$. The transistor $Tr_{12}$ turns OFF when the transistor $Tr_{11}$ is ON, or the transistor $Tr_{12}$ turns ON when the transistor $Tr_{11}$ is OFF.

The operation of the apparatus will now be explained in greater detail. When call signals come to the connection terminal 1 for the telephone circuit, they will be led to the starting circuit 2 through the contact $Y_{11}$ and a coupling condenser. The starting circuit 2 will generate an output after 3-10 seconds after a first call signal is received. The timer circuit 3 will be actuated by the output of the starting circuit 2 to control the operation of the apparatus during a predetermined time. That is, all of the answering operation times of the automatic telephone answering apparatus will be determined by the timer circuit 3. Since the switching circuit 5 is switched by the output of the timer circuit 3, the relay $Y_1$ will be actuated to change the contacts $Y_{11}$, $Y_{12}$ and $Y_{13}$. When the contact $Y_{11}$ is changed, a talking circuit will be connected to the matching transformer 6, so that the talking curcuit can be closed to enable transmission of a prerecorded message. When the contact $Y_{13}$ is closed, the motor $M_1$ will be driven to start the travel of the answering tape $T_1$. Then the answering message on the tape $T_1$ is reproduced by the magnetic head $H_1$ and is transmitted to the caller through the amplifier 7, the contact $Y_{21}$, the matching transformer 6, the contact $Y_{11}$ and the the connection terminal 1, respectively. When the message on tape $T_1$ to the caller is finished, the contact piece CP will be electrically shorted by the conductive foil(s) which is adhered to the answering tape $T_1$, thereby one end of the contact $Y_{12}$ is grounded. At this time, since the contact $Y_{12}$ is closed, the relay $Y_2$ will be actuated to change the contacts $Y_{21}$, $Y_{22}$ and $Y_{23}$. When the contact $Y_{22}$ is closed, the relay $Y_2$ is latched until the contact $Y_{12}$ is opened. The motor $M_1$ will stop due to the change of the contact $Y_{23}$, and then the motor $M_2$ will be driven so that the message recording tape $T_2$ will start to travel. The message signals from the caller will be recorded on the message recording tape $T_2$ through the contact $Y_{11}$, the matching transformer 6, the contacts $Y_{21}$ and $Y_{31}$, the amplifier 8, the contact $Y_{32}$ and the magnetic head $H_2$, respectively.

After a desired time (30 seconds to 1 minute, for example) has passed as determined by the timer circuit 3, the contacts $Y_{11}$, $Y_{12}$ and $Y_{13}$ of the relay $Y_1$ will be released to their original states if the switching circuit 5 is changed, and the apparatus stops its operation. That is, since the contact $Y_{13}$ is released, the operation of the motor $M_2$ will be stopped to finish the recording operation. Further, the relay $Y_2$ will no longer be actuated due to the release of the contact $Y_{12}$ and the contacts $Y_{21}$, $Y_{22}$ and $Y_{23}$ will be released to their original states. Therefore, the telephone circuit will be released to a waiting or standby condition upon the completion of a series of answering operations. The operation thus far described is conventional.

In the operation described above, it will be now assumed that the relay $Y_2$ is actuated and that the message recording tape $T_2$ is in the recording condition. In this case, when remote control signals (continuous signals at 800 Hz, for example) are sent to the apparatus by a particular caller, such signals will be recorded on the message recording tape $T_2$ and together applied to the remote control circuit 9. The detailed operation of the remote control circuit 9 will now be explained with the accompanying drawing of FIG. 3.

The remote control signals from the matching transformer 6 pass through the filter circuit 12 and are amplified with the amplifier 13 and are rectified with diodes $D_1$ and $D_2$ of the first switching circuit 14 and then are stored by the condenser $C_1$ which acts as an integrator. When the electric potential at the condenser $C_1$ reaches a desired value, the transistor $Tr_1$ will turn ON thereby turning OFF the transistor $Tr_2$. When the transistor $Tr_2$ is OFF the electrical charge on the condenser $C_2$, which has been previously charged, will be discharged for a period of time, about 5 seconds through a circuit constituted by the resistor $R_4$, $R_5$, the diode $D_3$ and the resistor $R_3$, thereby increasing the cathode potential of the Zener diode $ZD_1$. Accordingly, since the Zener diode $ZD_1$ becomes conductive, the transistor $Tr_3$ will be turned ON, and the transistor $Tr_4$ will also be turned ON. Due to the ON state of the transistor $Tr_4$, electric power will be supplied to the circuits following switching circuit 16 and a base current will also be supplied to the transistor $Tr_3$ through the resistor $R_9$ and the diode $D_6$, so that transistors $Tr_3$ and $Tr_4$ can be self-sustained in the ON state. In this case, it is possible to amplify signals from the magnetic head $H_2$ with the amplifier 8 by energizing the relay $Y_3$. When the transistor $Tr_4$ turns ON, the transistor $Tr_5$ will turn ON within a time period (about 1 second) determined by the condenser $C_4$ and the resistor $R_{11}$, and this results in the transistor $Tr_6$ being turned ON, also. Therefore, the electric power will be applied to the solenoid $SD_1$ to reset the counter switch 4 to zero. In addition, the transistor $Tr_7$ will turn ON within a time period (about 1 second ) determined by the condenser $C_5$ and the resistor $R_{12}$, so that the transistor $Tr_8$ also turns ON. According to the operation, the solenoid $SD_2$ will be actuated to rewind the message recording tape $T_2$. In this case, the rewinding operation will be mechanically held by means of a mechanism of the type described in U.S. Pat. No. 3,843,966 until the solenoid $SD_2$ is again actuated. Further, since the counter is counted backward as soon as the tape is rewound, the counter switch 4 will be changed. Accordingly, the switching circuit 5 will be kept in an ON state, and the relay $Y_1$ can be maintained in the energized condition independent of the time period determined by the timer curcuit 3.

In addition, since the transistor $Tr_4$ in the first power supply switching circuit 16 is ON, the Zener diode $ZD_2$ will conduct after a time period (about 10 seconds) determined by the resistor $R_{13}$ and the condenser $C_6$ in the second power supply switching circuit 19. Accordingly, transistors $Tr_9$ and $Tr_{10}$ are turned On. In this case, the On state of transistors $Tr_9$ and $Tr_{10}$ is self-sustained in the same manner as the first power supply switching circuit 16. Due to the ON state of the transistor $Tr_{10}$, the transistor $Tr_{12}$ will turn ON within a time period (about 1 second) determined by the condenser $C_8$ and the resistor $R_{22}$. Since a base current is supplied to the transistor $Tr_7$ of the tape control driving circuit 18 through the diode $D_{14}$ within this time constant, transistors $Tr_7$ and $Tr_8$ are turned ON to again actuate the solenoid $SD_2$ and stop the rewinding operation. Therefore, since the rewinding of the message recording tape $T_2$ is finished to automatically put the recording tape in a reproducing condition by means of an apparatus within the tape recorder, the reproducing signals from the magnetic head $H_2$ will be amplified with the amplifier 8 and will be transmitted to the caller In this case, when the transistor $Tr_{12}$ is ON, the electrical charge on the condenser $C_9$ will be discharged.

When the caller desires to listen again to the message partially, the remote control signals will be amplified with the amplifier 13 through the filter circuit 12 in the same manner as described above if the caller again sends them. Therefore, the transistor $Tr_1$ will turn ON while the transistor $Tr_2$ turns OFF. Accordingly, although the electrical charge on the condenser $C_2$, which has been recharged, is discharged, the diode $D_3$ will become reverse-biased and become blocking since the transistor $Tr_3$ is ON, so that the electrical charges on the condenser $C_2$ will be discharged through only resistors $R_4$ and $R_3$ without passing through the resistor $R_5$. Accordingly, the time constant will be made longer than that described above, and will become 6 seconds, for example. In this case, when the remote control signals arrive for 6 seconds continuously, the Zener diode $ZD_1$ will conduct to turn on the transistor $Tr_{11}$. Since the transistor $Tr_{12}$ is OFF by this operation, a base current will be applied to the transistor $Tr_7$ through the diode $D_{15}$ for a period of time determined by the condenser $C_9$ and the resistor $R_{25}$, thereby turning the transistors $Tr_7$ and $Tr_8$ ON. Accordingly, the solenoid $SD_2$ will be acutated to rewind the message recording tape $T_2$. In this case, although transistors $Tr_7$ and $Tr_8$ turn OFF and the solenoid $SD_2$ is not actuated after the time constant determined by the condenser $C_5$ and the resistor $R_{12}$, the rewinding condition can be held by an apparatus within the tape recorder.

When the call of the remote control signals is stopped after the message recording tape is rewound for a desired time, the Zener diode $ZD_1$ will cease conducting because the transistor $Tr_1$ turns OFF and the transistor $Tr_2$ turns ON. Since the transistor $Tr_{11}$ turns OFF and the transistor $Tr_{12}$ turns ON by the described operation, a base current will be supplied to the transistor $Tr_7$ through the diode $D_{14}$ for a period of time (about 1 second) determined by the condenser $C_8$ and the resistor $R_{22}$. Accordingly, since transistors $Tr_7$ and $Tr_8$ are ON, the electric power will be supplied to the solenoid $SD_2$ again, and the rewinding condition will be released so that the message recording tape is put into the reproducing condition.

Since the switching circuit 5, which had maintained the whole operation, is OFF when the reproduction of the tape recorder is finished to return the counter switch 4 to zero, the power supply for the relay $Y_1$ will be stopped to release the talking circuit of the telephone circuit to assume a waiting condition, thereby concluding the series of operations.

According to the present invention as described above, because the first remote control signals are distinguished from remote control signals for partially rewinding the message recording tape in the reproduing process by changing time constant circuits, the remote control signals with the same frequency can be used as a plurality of instructive signals if reproduction and listening are desired by means of the remote control. In addition, if the first remote control signals, which have been recorded on the tape, that is, the rewinding instructive signals for starting remote reporduction are reproduced, a reliable remote reproducing operation can be achieved because the rewind instructive signals are distinguished from the reproduced signals in spite of the same frequency.

It will be apparent that the embodiment shown is only exemplary and that various modifications can be made in construction and arrangement within the scope of the invention as defined in the appended Claims.

I claim:

1. In a telephone answering apparatus including a tape transport mechanism having a recording tape and a record/playback head for playing back previously recorded messages, said mechanism being of the type operable by a single plunger to switch the direction of motion of the tape, a remote control circuit comprising:
   detecting means for detecting single frequency remote control signals received by the telephone answering apparatus,
   a time constant circuit including a condenser and first and second switchable resistive discharge paths for said condenser,
   first switch means responsive to the discharge of said condenser through said first resistive discharge path for switching said time constant circuit to said second resistive discharge path to permit remote control signals having the same frequency but occurring sequentially in time to be used for a plurality of instructive signals,
   a first power supply switch responsive to said first switch means to provide a first power source output,
   a tape control driving circuit including actuating means for actuating said single plunger, said tape control driving circuit being initially responsive to said first power source output from said first power supply switch to cause said tape transport mechanism to rewind said recording tape,
   a second power supply switch including time delay means and responsive to the operation of said first power supply switch to provide a second power source output after a predetermined time delay, and
   second switch means initially responsive to said second power source output to provide a signal to said tape control driving circuit to cause said tape transport mechanism to stop rewinding said tape and begin playing back said previously recorded messages, said second switch means thereafter being responsive to the discharge of said condneser through said second resistive discharge path to provide a signal to said tape control driving circuit to cause said tape transport mechanism to again rewind said recording tape followed by another signal to said tape control driving circuit to cause said tape transport mechanism to resume playing back said previously recorded messages.

2. A remote control circuit as recited in claim 4, wherein said tape transport mechanism includes a counter and switch mechanism and said remote control circuit further comprises a counter reset driving circuit including actuating means for resetting said counter and switch mechanism to zero, said counter reset driving circuit being responsive to said first power source output from said first power supply switch to cause said counter and switch mechanism to be reset to zero.

3. A remote control circuit as recited in claim 1, wherein said detecting means comprises
    filter means for passing said single frequency remote control signals,
    detector and integrator means responsive to the output of said filter means for accumulating and storing a voltage, and
    third switch means responsive to a predetermined voltage level output from said detector and integrator means for connecting said condenser to said first or second resistive discharger paths.

* * * * *